(12) United States Patent
Brill

(10) Patent No.: US 6,505,101 B1
(45) Date of Patent: Jan. 7, 2003

(54) REMOTE VEHICLE IDENTIFICATION AND DISABLING SYSTEM

(76) Inventor: William E. Brill, 1407 La Salina St., Oceanside, CA (US) 92054-5433

( * ) Notice: Subject to any disclaimer, the term of this patent is extended or adjusted under 35 U.S.C. 154(b) by 0 days.

(21) Appl. No.: 09/917,159

(22) Filed: Jul. 30, 2001

(51) Int. Cl.$^7$ ............................................. B60R 25/10
(52) U.S. Cl. .................. 701/2; 342/357.07; 342/457; 342/69; 342/70; 340/425.5; 340/426; 455/450
(58) Field of Search .................. 701/2; 342/357.07, 342/457, 69, 70; 340/425.5, 426, 825.36, 825.49; 455/8, 450, 60, 509, 526

(56) References Cited

U.S. PATENT DOCUMENTS

| | | | | |
|---|---|---|---|---|
| 4,660,528 A | * | 4/1987 | Buck ............................ | 123/333 |
| 4,908,629 A | * | 3/1990 | Apsell et al. ................. | 342/457 |
| 5,001,777 A | * | 3/1991 | Liautaud ...................... | 455/227 |
| 5,184,314 A | * | 2/1993 | Kelly et al. ................... | 708/131 |
| 5,453,730 A | | 9/1995 | De-Grinis et al. ........... | 340/426 |
| 5,513,244 A | | 4/1996 | Joao et al. .................... | 455/404 |
| 5,798,714 A | * | 8/1998 | Nyfelt .......................... | 340/988 |
| 5,861,799 A | * | 1/1999 | Szwed .......................... | 340/425.5 |
| 5,933,075 A | | 8/1999 | Ditson .......................... | 340/426 |
| 6,124,805 A | | 9/2000 | Gabbard ...................... | 340/825.72 |
| 6,313,740 B1 | * | 11/2001 | Goetz ........................... | 340/426 |

* cited by examiner

*Primary Examiner*—William A. Cuchlinski, Jr.
*Assistant Examiner*—Marthe Y. Marc-Coleman
(74) *Attorney, Agent, or Firm*—David A. Guerra

(57) ABSTRACT

A remote vehicle identification and disabling system for identifying and controlling a vehicles engine. The system has a limited ranged programmable transceiver unit mounted in a non-civilian vehicle for sending and receiving a signal through an antenna located in the grille. A control and display unit is located in the cab that allows access to an onboard computer for accessing a remote police database. The system also has a civilian vehicle mounted multiple channel transceiver that controls a fail-open valve which is connected to a fuel line of the civilian vehicle to control the amount of fuel supplied to the engine. The civilian vehicle unit transmits an identification signal to the non-civilian unit upon request and if the civilian unit receives the identical identification signal from the non-civilian unit then the valve will be activated. A remote control unit transmitting at a frequency other than the non-civilian unit can be used to activate the valve. The non-civilian unit transmits at a frequency that has higher priority over the remote control deter from any unauthorized activation of the valve.

9 Claims, 2 Drawing Sheets

REMOTE VEHICLE IDENTIFICATION AND DISABLING SYSTEM

BACKGROUND OF THE INVENTION

1. Field of the Invention

The present invention relates to a remote vehicle identification and disabling system and more particularly pertains to remotely identifying and disabling a moving vehicle.

2. Description of the Prior Art

The use of remotely operated vehicle disabling systems of various designs and configurations is known in the prior art. More specifically, remotely operated vehicle disabling systems previously devised and utilized for the purpose of disabling a vehicle from a remote location are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,124,805 to Gabbard discloses a remotely operable vehicle identification and disabling system. The disclosure teaches the use of a vehicle mounted and a hand held transmitter to disable and identify a subject vehicle. The disclosure also teaches the method of sending a query message prior to disabling the subject vehicle.

U.S. Pat. No. 5,513,244 to Joao et al. discloses a remote-controlled vehicle anti-theft system. The disclosure teaches the use of a remote transmitting unit for sending a signal to a subject vehicle and activating a disabling system. The disabling system controls the operation of the vehicle's fuel pump.

U.S. Pat. No. 4,660,528 to Buck discloses an apparatus for remote termination of a motor vehicle. The disclosure teaches the use of a transmitter for sending a signal to a vehicle mounted receiver for controlling the fuel supply to the engine.

U.S. Pat. No. 5,453,730 to De.Grinis et al. discloses a vehicle anti-theft system. The disclosure teaches the use of a hand-held transmitter for sending a signal to a vehicle mounted receiver that will control the fuel supply to the engine.

Lastly, U.S. Pat. No. 5,933,075 to Ditson discloses a system for disabling a speeding vehicle in a safe manner. The disclosure teaches the use of a hand-held transmitter for disabling a speeding vehicle.

While these devices fulfill their respective, particular objectives and requirements, the aforementioned patents do not describe a remote vehicle identification and disabling system that allows remote identifying and disabling of a moving vehicle through simple and effective components. The 6,124,805 patent makes no provisions for the subject vehicle to respond to the query message faster according to the strength of the query message to prevent the accidental disabling of vehicles in the vicinity of the disabling signal. Furthermore, there is not teaching of connecting a vehicle mounted transmission unit to an onboard law-enforcement computer system. The 5,513,244 patent does not teach the use of a hand-held transmitting unit to activate the disabling system and the use of fuel supply valve to limit the amount of fuel the engine receives to slow the vehicle down in a safe manner. Furthermore, there is no teaching for sending a query message to the subject vehicle prior to disabling it and connecting the transmission unit to an onboard law-enforcement computer system. The 4,660,528 patent does not teach the use of a hand-held transmitting unit to activate the fuel supply disabling system. Furthermore there is no teaching for sending a query message to the subject vehicle prior to disabling it and connecting the transmission unit to an onboard law-enforcement computer system. The 5,453,730 patent makes no provisions of sending a query message to the subject vehicle prior to disabling it and connecting the transmission unit to an onboard law-enforcement computer system. Lastly, the 5,933,075 patent makes no teaching of sending a query message to the subject vehicle prior to disabling it and connecting the transmission unit to an onboard law-enforcement computer system. Furthermore, there is not teaching of the use of a fuel fail-safe valve.

In this respect, the remote vehicle identification and disabling system according to the present invention substantially departs from the conventional concepts and designs of the prior art, and in doing so provides an apparatus primarily developed for the purpose of remotely identifying and disabling a moving vehicle through simple and effective components.

Therefore, it can be appreciated that there exists a continuing need for a new and improved remote vehicle identification and disabling system which can be used for remotely identifying and disabling a moving vehicle through simple and effective components. In this regard, the present invention substantially fulfills this need.

SUMMARY OF THE INVENTION

In view of the foregoing disadvantages inherent in the known types of remotely operated vehicle disabling systems now present in the prior art, the present invention provides an improved remote vehicle identification and disabling system. As such, the general purpose of the present invention, which will be described subsequently in greater detail, is to provide a new and improved remote vehicle identification and disabling system and method which has all the advantages of the prior art and none of the disadvantages.

"To attain this, the present invention essentially comprises a new and improved remote vehicle identification and disabling system having a non-civilian transceiver unit in a first vehicle, a civilian unit mounted in a second vehicle and a remote control unit. The non-civilian unit has a limited range transceiver for sending and receiving a signal at a predetermined frequency. A control unit is located in the cab of the first vehicle and is connected to the limited range transceiver for controlling the functions of the limited range transceiver. A display unit is also located in the cab and is connected to the control unit and the limited range transceiver for displaying information from the control unit and the limited range transceiver. An antenna is adaptively mounted to a forward grille of the first vehicle and is connected to the limited range transceiver. The non-civilian unit is connected to a computer for remotely connecting to a database for receiving information from the database corresponding to a signal from the non-civilian unit. The civilian transceiver unit has a directional antenna mounted in the second vehicle that extends down and toward the rear. A two channel programmable limited range transceiver is connected to the directional antenna for communicating and verifying a transmission from the programmable transceiver. The two channel programmable limited range transceiver has a primary and a secondary channel, wherein the primary channel has a higher priority over the secondary channel and is programmed to receive signals at the same frequency as the limited range transceiver of the non-civilian unit. A valve actuator is connected to the two channel programmable limited range transceiver which controls a fail-open valve. The fail-open valve is mounted in a fuel line of the second vehicle for controlling the flow of fuel to a minimum amount needed to keep an engine idling running in the second vehicle. The remote control unit is used to activate and deactivate the fail-open valve of the civilian unit. The remote control unit has a battery, a transmitter connected to the battery for transmitting a signal at a frequency corresponding to the second channel of the two channel programmable limited range transceiver of the civilian unit and a switch connected to the transmitter and the battery for activating the transmitter."

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved remote vehicle identification and disabling system which has all of the advantages of the prior art remotely operated vehicle disabling systems and none of the disadvantages.

It is another object of the present invention to provide a new and improved remote vehicle identification and disabling system, which may be easily and efficiently manufactured and marketed.

It is further object of the present invention to provide a new and improved remote vehicle identification and disabling system, which is of durable and reliable constructions.

An even further object of the present invention is to provide a new and improved remote vehicle identification and disabling system which is susceptible of a low cost of manufacture with regard to both materials and labor, and which accordingly is then susceptible of low prices of sale to the consuming public, thereby making such remote vehicle identification and disabling system economically available to the buying public.

Even still another object of the present invention is to provide a remote vehicle identification and disabling system for remotely identifying and disabling a moving vehicle through simple and effective components.

Lastly, it is an object of the present invention to provide a new and improved remote vehicle identification and disabling system for identifying a vehicle and controlling a vehicle's engine. The system has a non-civilian unit and a civilian unit. The non-civilian unit has a transceiver for sending and receiving a signal, a control and display unit connected to the transceiver for controlling and displaying information from the transceiver and an antenna mounted in a first vehicle. The civilian unit has a transceiver having at least one channel for communicating with the transceiver of the non-civilian unit, an antenna connected to the transceiver of the civilian unit and a valve mounted in a fuel line of the second vehicle and connected to the transceiver of the civilian unit for controlling fuel flow.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
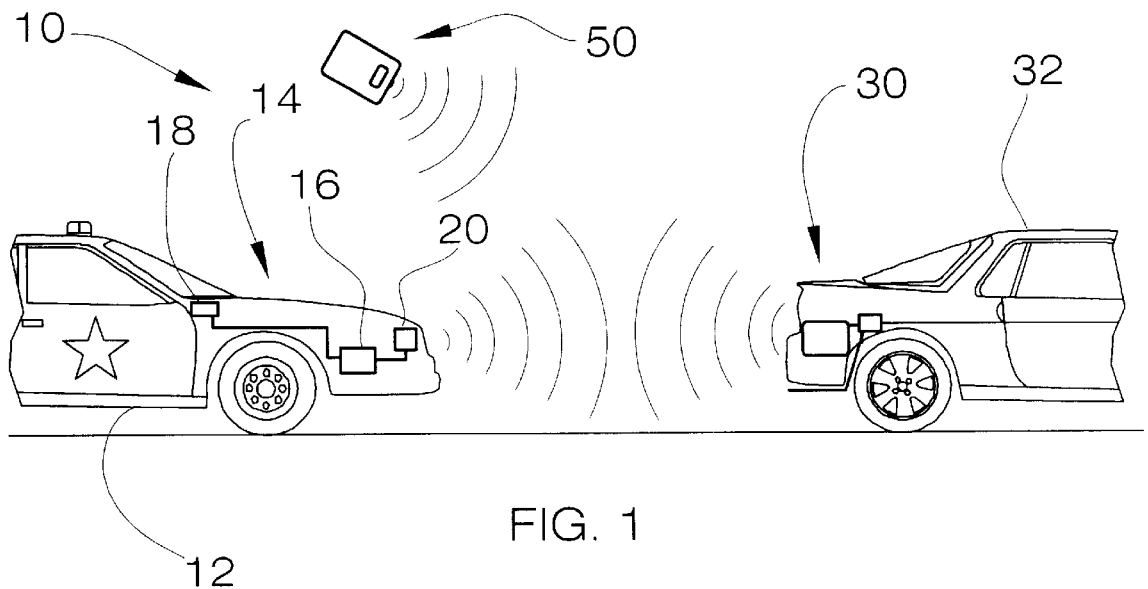
FIG. 1 is a side elevation view of the preferred embodiment of the remote vehicle identification and disabling system constructed in accordance with the principles of the present invention.

With reference now to the drawings, an in particular to FIG. 1, a new and improved remote vehicle identification and disabling system 10 for remotely identifying and disabling a vehicle will be described. More particularly, the remote vehicle identification and disabling system 10 has a non-civilian transceiver unit 14, a civilian transceiver unit 30 and a remote control unit 50. The remote vehicle identification and disabling system 10 is not limited to use with only land vehicles, but can be adaptively installed in any transportation device where one transportation device needs to identify and disable another transportation device having an engine. The remote vehicle identification and disabling system 10 maybe adapted to control electrically powered vehicles.

Figure 2:
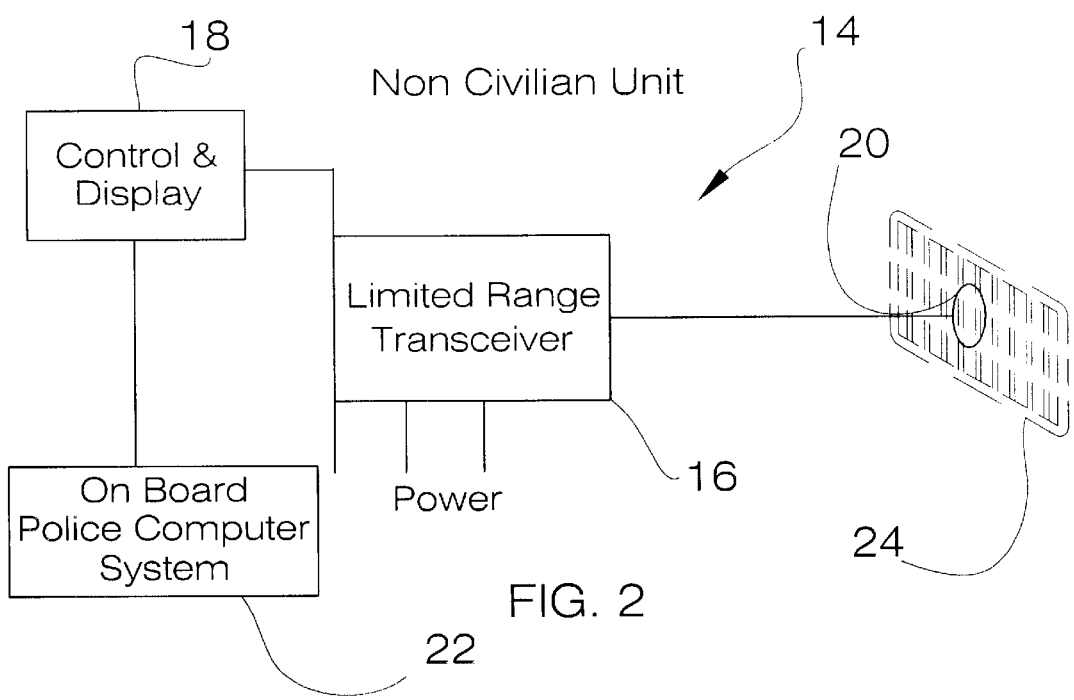
FIG. 2 is a schematic diagram of the police vehicle mounted unit of the present invention.

As best illustrated in FIG. 2, the non-civilian unit 14 is located in a non-civilian vehicle 12 and has a limited range programmable transceiver 16 connected to the existing power supply of the non-civilian vehicle 12 and to a high efficiency directional antenna 20 mounted facing forward. The directional antenna 20 can be mounted to a grille 24 or any forward facing member of the non-civilian vehicle 12. A control and display unit 18 is connected to the programmable transceiver 16 for controlling the operational functions of the programmable transceiver and for displaying informational data from the programmable transceiver. The control and display unit 18 can be mounted anywhere in the non-civilian vehicle 12 but the preferred mounting location is in the cab facing towards the occupants in the non-civilian vehicle. The control and display unit 18 can be mounted to the dashboard of the non-civilian vehicle 12 by way of an adjustable mounting bracket or the control and display unit can be built into the dashboard. Furthermore, the non-civilian unit 14 can be connected to an existing onboard non-civilian computer system 22. This allows the non-civilian unit 14 to access a remote database for receiving and displaying information from the remote database to an occupant in the non-civilian vehicle 12.

Figure 3:
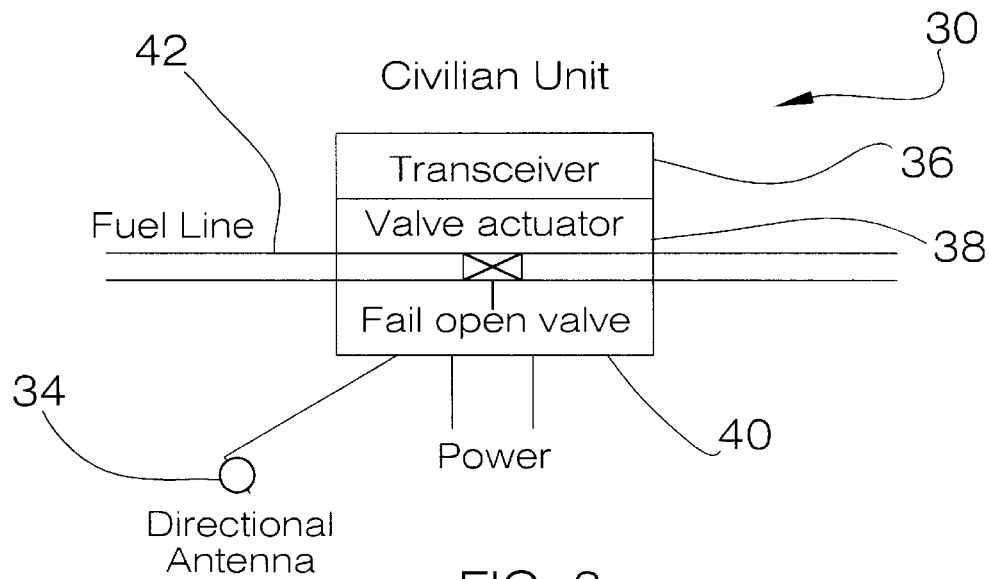
FIG. 3 is a schematic diagram of the civilian vehicle mounted unit of the present invention.

The civilian transceiver unit 30 is mounted on a civilian vehicle 32, preferably towards the rear of the civilian vehicle. The civilian transceiver unit 30 has a directional antenna 34 that extends down and toward the rear of the civilian vehicle 32, a two channel programmable limited range transceiver 36, a valve actuator 38 and a fail-open valve 40 connected to a fuel line 42 in the civilian vehicle, all of which are best illustrated in FIG. 3. Preferably, the directional antenna 34 is mounted under the rear bumper of the civilian vehicle 32.

The two channel programmable limited range transceiver 36 is connected to the directional antenna 34 and to the valve actuator 38. Furthermore, the two channel programmable limited range transceiver 36 has a primary channel and a secondary channel. The primary channel has higher priority over the secondary channel.

The fail-open valve 40 is mounted in a fuel line 42 of the civilian vehicle 32 and is connected to the valve actuator 38. The fail-open valve 40 will restrict fuel flow to an engine in the civilian vehicle 32 to the minimum amount needed to keep the engine running at idle speed. The fail-open valve 40 may cut off the fuel supply to the engine completely if needed. Preferably, the fail-open valve 40 is mounted in the rear of the civilian vehicle 32 near any fuel supply tank.

Figure 4:
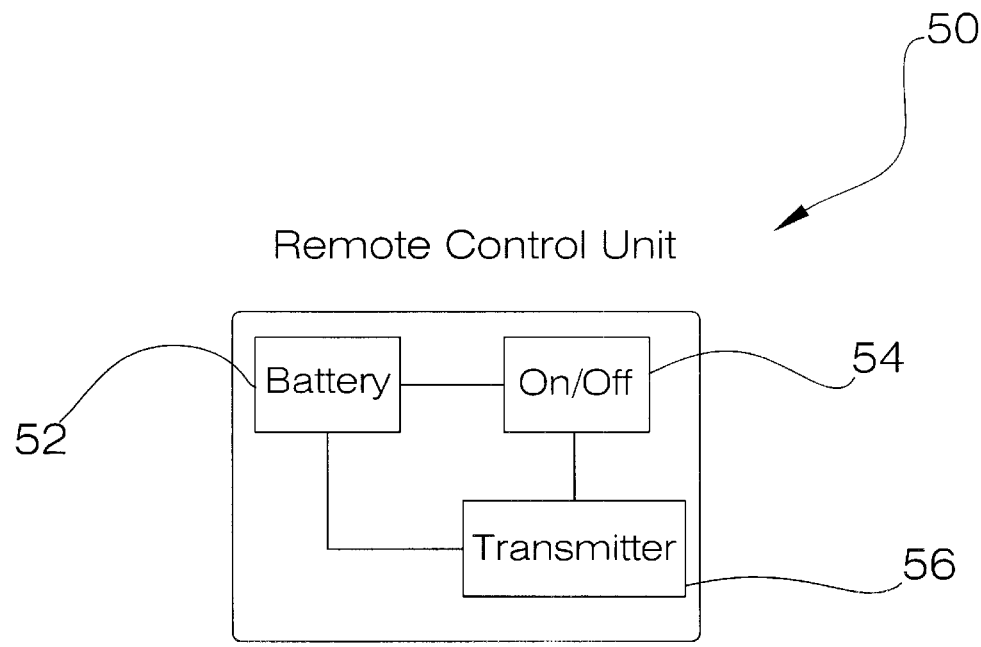
FIG. 4 is a schematic diagram of the hand-held remote unit of the present invention.

As best illustrated in FIG. 4, the remote control unit 50 is used to activate or deactivate the fail-open valve 40 from a location other than the non-civilian vehicle 12. The remote control unit 50 has a battery 52, an on/off switch 54 and a transmitter 56. The remote control unit 50 can be housed in an ergonomically configured housing which fits snugly in the palm of a user's hand.

In use, one of the purposes of this system is to prevent high-speed police pursuits, provide instant vehicle identification to the police, and also to provide an effective anti-theft function. The system will consist of a directional signal, limited range, programmable transceiver 16 mounted on all non-civilian vehicles 12, a two-channel, programmable, limited range transceiver 36 and fuel valve 40 controller mounted on the fuel line 42 of all civilian vehicles 32, and a hand-held remote control unit 50.

The non-civilian unit 30 will have a high efficiency directional antenna 20 is mounted facing forward in the grill 24 of the non-civilian vehicle 12. The civilian vehicle 32 unit will have a directional antenna 34 extending down and toward the rear.

Both the non-civilian vehicle unit 14 and the civilian vehicle unit 30 will have a set frequency, universal among all vehicles. When activated, the non-civilian unit 14 will send a signal directed at the subject civilian vehicle 32 asking it for its individual identification number. The subject civilian unit 30 will automatically send its individual identification number back to the non-civilian unit 14. The non-civilian unit 14 will then send this individual identification number back to the subject civilian unit 30 which will verify the transmission and then shut the fuel valve 40. The fuel valve 40 will reduce the flow of fuel to the minimum amount needed to keep the engine running at idle speed. The fuel valve 40 will be of the fail-open variety so that incidental failure of the unit will not disable the subject civilian vehicle 32. The civilian unit 30 will automatically reset when the subject civilian vehicle battery has one connector cable disengaged and re-engaged.

Leakage of the non-civilian radio signal may cause other civilian vehicle units in range to respond as well as the subject civilian unit. However, the subject civilian unit will receive the strongest signal and will be programmed to respond faster according to the strength of the non-civilian signal. Therefore, the subject civilian unit will respond first and the non-civilian unit will be programmed to ignore all subsequent responses.

The non-civilian unit 14 will also have an identification only setting, which would access the subject civilian vehicle's id code but would not send it back to the subject civilian unit 30, preventing the disabling of the subject civilian vehicle 32. Tied in with the onboard police computer system 22, this would give almost instant information about the subject civilian vehicle 32.

The hand-held anti-theft remote unit 50 would access a second channel on the subject civilian unit transceiver 36 utilizing a different id number. When turned on, the fuel valve 40 would shut completely. When turned off, the fuel valve 40 would open. The non-civilian unit channel would always have priority and would not be affected by the state of the hand-held anti-theft remote unit 50.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved remote vehicle identification and disabling system comprising, in combination:

a non-civilian transceiver unit in a first vehicle, the non-civilian transceiver unit including:

a limited range transceiver mounted in the first vehicle for sending and receiving a signal at a predetermined frequency;

a control unit located in the first vehicle and connected to the limited range transceiver for controlling the functions of the limited range transceiver;

a display unit located in the first vehicle and connected to the control unit and the limited range transceiver for displaying information from the control unit and the limited range transceiver;

an antenna adaptively mounted to a forward grille of the first vehicle and connected to the limited range transceiver;

an onboard computer in the first vehicle connected to the non-civilian unit for remotely connecting to a database for receiving information from the database corresponding to a signal from the non-civilian unit;

a civilian transceiver unit in a second vehicle, the civilian transceiver unit including:

a directional antenna adaptively mounted in the second vehicle extending down and toward the rear of the second vehicle;

a two channel programmable limited range transceiver connected to the directional antenna for communicating and verifying a transmission from the programmable transceiver of the first vehicle, the two channel programmable limited range transceiver having a primary and a secondary channel, the primary channel having higher priority over the secondary channel and programmed to receive signals at the same frequency as the limited range transceiver of the non-civilian unit;

a valve actuator connected to the two channel programmable limited range transceiver;

a fail-open valve connected to the valve actuator and mounted in a fuel line of the second vehicle for controlling the flow of fuel to a minimum amount needed to keep an engine idling running in the second vehicle;

a remote control unit for activating and deactivating the fail-open valve of the civilian unit, the remote control unit including:

a battery for supplying power to the remote control unit;

a transmitter connected to the battery for transmitting a signal at a frequency corresponding to the second channel of the two channel programmable limited range transceiver of the civilian unit; and a switch connected to the transmitter and the battery for activating the transmitter.

2. A remote vehicle identification and disabling system for identifying a vehicle and disabling the vehicle's engine comprising, in combination:

a non-civilian unit in a first vehicle, the non-civilian unit including:

a transceiver for sending and receiving a signal;

a control and display unit connected to the transceiver for controlling and displaying information from the transceiver;

an antenna connected to the transceiver;

a civilian unit in a second vehicle, the civilian unit including:

a transceiver having at least one channel for communicating with the transceiver of the non-civilian unit;

an antenna connected to the transceiver of the civilian unit;

a valve actuator connected to the transceiver of the civilian unit; and a valve mounted in a fuel line of the second vehicle and connected to the valve actuator of the civilian unit for controlling fuel flow.

3. The remote vehicle identification and disabling system as set forth in claim 2 wherein the transceiver of the civilian unit is a programmable limited range transceiver which transmits and receives a signal at a predetermined frequency.

4. The remote vehicle identification and disabling system as set forth in claim 2 where in the antenna of the non-civilian unit is mounted to a forward grille of the first vehicle.

5. The remote vehicle identification and disabling system as set forth in claim 2, further comprising a computer connected to the non-civilian unit for remotely connecting to a database for receiving information corresponding to a signal from the non-civilian unit.

6. The remote vehicle identification and disabling system as set forth in claim 2 wherein the transceiver of the civilian unit is a two channel programmable limited range transceiver having a primary channel and a secondary channel.

7. The remote vehicle identification and disabling system as set forth in claim 6 wherein the primary channel having higher priority over the secondary channel and programmed to receive signals from the transceiver of the non-civilian unit.

8. The remote vehicle identification and disabling system as set forth in claim 2 wherein the valve is a fail-open valve and allows a minimum amount of fuel needed to keep an engine in the second vehicle idling.

9. The remote vehicle identification and disabling system as set forth in claim 2, further comprising a remote control unit for activating and deactivating the valve of the civilian unit.

* * * * *